US007667116B2

(12) United States Patent
Yamashita et al.

(10) Patent No.: US 7,667,116 B2
(45) Date of Patent: Feb. 23, 2010

(54) KEY ACTUATING SYSTEM

(75) Inventors: Masayoshi Yamashita, Hamamatsu (JP); Shuichi Sawada, Hamamatsu (JP); Hideo Suzuki, Hamamatsu (JP); Emiko Suzuki, legal representative, Hamamatsu (JP); Yoshinori Hayashi, Iwata (JP)

(73) Assignee: Yamaha Corporation, Hamamatsu-shi (JP)

( * ) Notice: Subject to any disclaimer, the term of this patent is extended or adjusted under 35 U.S.C. 154(b) by 337 days.

(21) Appl. No.: 11/896,599

(22) Filed: Sep. 4, 2007

(65) Prior Publication Data

US 2008/0092720 A1 Apr. 24, 2008

(30) Foreign Application Priority Data

Sep. 4, 2006 (JP) .......................... P 2006-239500

(51) Int. Cl.
*G10F 1/02* (2006.01)
*G01P 3/00* (2006.01)

(52) U.S. Cl. .......................................... 84/20; 84/687

(58) Field of Classification Search ..................... 84/13, 84/16, 18, 19, 20, 21, 22, 687, 688
See application file for complete search history.

(56) References Cited

U.S. PATENT DOCUMENTS 6,194,643 B1 * 2/2001 Meisel .......................... 84/18
6,444,885 B2 * 9/2002 Meisel .......................... 84/16
6,781,046 B2 * 8/2004 Meisel .......................... 84/20
6,888,052 B2 * 5/2005 Meisel .......................... 84/16
6,891,092 B2 * 5/2005 Meisel .......................... 84/16
7,019,201 B2 * 3/2006 Meisel .......................... 84/16
7,385,134 B2 * 6/2008 Sawada et al. ................ 84/723
7,547,833 B2 * 6/2009 Yamashita ..................... 84/18
2001/0000569 A1 * 5/2001 Meisel ........................ 84/688

(Continued)

FOREIGN PATENT DOCUMENTS

JP 2-232695 A 9/1990

(Continued)

OTHER PUBLICATIONS

Notice of Allowance, issued to Korean Patent Application No. 10-2007-0087341, issued on Oct. 23, 2009; 3 pages.

*Primary Examiner*—Jeffrey Donels
*Assistant Examiner*—Andrew R Millikin
(74) *Attorney, Agent, or Firm*—Smith Patent Office

(57) ABSTRACT

A key actuating system (1) of a keyboard musical instrument is provided which helps quickly push the keys by reducing reaction force with respect to force of pushing the keys during manual operation, and which supports a person having less strength to play the keyboard musical instrument. The key actuating system for a keyboard musical instrument generates a sound when a key (3) is pushed including: a pressure detection sensor (11) detecting a pushing pressure on the key; a status detection sensor (13) detecting a movement status of the key: an actuator (15) actuating the key in a pushing direction of the key; and a control portion (19), when the pressure detection sensor detects the pushing pressure and the status detection sensor detects motion of the key, controls operations of the actuator in order to maintain the detected pressure by the pressure detection sensor at a pressure threshold which is in a range larger than 0 and smaller than a pushing pressure on the key which is necessary for making a sound.

3 Claims, 4 Drawing Sheets

U.S. PATENT DOCUMENTS

| | | | | |
|---|---|---|---|---|
| 2001/0017075 | A1* | 8/2001 | Meisel | 84/216 |
| 2002/0184989 | A1* | 12/2002 | Meisel | 84/216 |
| 2003/0213355 | A9* | 11/2003 | Meisel | 84/216 |
| 2005/0022649 | A1* | 2/2005 | Meisel | 84/16 |
| 2005/0188810 | A1* | 9/2005 | Meisel | 84/16 |
| 2005/0204906 | A1 | 9/2005 | Lengeling | |
| 2006/0272469 | A1* | 12/2006 | Meisel | 84/21 |
| 2007/0068372 | A1* | 3/2007 | Masuda et al. | 84/723 |
| 2007/0227343 | A1* | 10/2007 | Sawada et al. | 84/723 |
| 2007/0234887 | A1 | 10/2007 | Sawada et al. | |
| 2007/0234890 | A1* | 10/2007 | Yamashita | 84/745 |
| 2008/0017014 | A1* | 1/2008 | Suzuki | 84/385 R |
| 2008/0087157 | A1* | 4/2008 | Suzuki et al. | 84/385 A |
| 2008/0092720 | A1* | 4/2008 | Yamashita et al. | 84/600 |
| 2008/0229904 | A1* | 9/2008 | Komatsu | 84/439 |
| 2008/0229908 | A1* | 9/2008 | Sasaki | 84/600 |
| 2008/0314230 | A1* | 12/2008 | Sasaki et al. | 84/601 |

FOREIGN PATENT DOCUMENTS

| | | | |
|---|---|---|---|
| JP | 2-254494 | A | 10/1990 |
| JP | 4-125693 | A | 4/1992 |
| JP | 4-204697 | A | 7/1992 |
| JP | 5-11765 | A | 1/1993 |
| JP | 5-346779 | A | 12/1993 |
| JP | 09-016177 | A | 1/1997 |
| JP | 2004-94284 | A | 3/2004 |
| JP | 2007-256850 | A | 10/2007 |
| JP | 2008-26515 | A | 2/2008 |
| WO | WO 00/54248 | A | 9/2000 |
| WO | WO 02/075717 | A | 9/2002 |

* cited by examiner

KEY ACTUATING SYSTEM

BACKGROUND OF THE INVENTION

1. Field of the Invention

The present invention relates to a key actuating system which controls or adjusts the reaction force of a key due to an applied force when a person plays a keyboard musical instrument or a clavier by hand.

Priority is claimed on Japanese Patent Application No. 2006-239500, filed Sep. 4, 2006, the content of which is incorporated herein by reference.

2. Description of Related Art

In the prior art, there are keyboard musical instruments such as electric keyboards and acoustic pianos which have actuators such as solenoids for operating or actuating keys independently (for example, see Japanese Unexamined Patent Application, First Publication NO. H02-254494, hereinafter a patent document 1, and Japanese Unexamined Patent Application, First Publication NO. H04-204697, hereinafter a patent document 2). Such keyboard musical instruments can operate or actuate each of the keys by using the actuators in accordance with music information corresponding to a sequence of sounds which constitute music, and can automatically play the music.

Various conventional keyboard musical instruments have been proposed and one of such the keyboard musical instruments, as described in the patent document 1, has a position sensor which detects operations or movements of the keys. Therefore, the keyboard musical instrument disclosed in the patent document 1 is constituted so as to be able to appropriately operate the keys upon automatically playing the instrument by using the actuators based on detection results of a position sensor.

Moreover, by using an electric keyboard musical instrument disclosed in the patent document 2 which generates electric sounds, it is possible to switch between an automatic playing mode and a manual playing mode. Furthermore, in this manual playing mode, the reaction force (braking force of the key) is affected by a pushing force on the key when a player pushes the key by his/her finger. Therefore, the patent document 2 discloses a constitution with an object of having the reaction force of the key feel like that of a natural or non-electric keyboard musical instrument. The patent document 2 applies the reaction force because, with respect to the electric keyboard musical instruments, the reaction force of the key is much lighter than that of natural or non-electric keyboard musical instruments.

On the other hand, with respect to natural or non-electric keyboard musical instruments, natural sounds are generated in a manner such as by hitting strings, and portions of the instrument which are moved or operated are heavy if they correspond to lower sounds. Therefore, there is a problem in which a larger force is necessary to push or operate the key for lower sounds than a portion for higher sounds, and it is difficult to quickly push the keys. Moreover, for a beginner, a child and a middle-age or old person, it is difficult to play the above-described natural or non-electric keyboard musical instruments.

It should be noted that the patent document 1 and 2 cannot solve the above-described problems. That is, the patent document 1 discloses a constitution in which the keys are merely actuated or operated by using the actuators in the case of automatic operation, and moreover, in the patent document 2, the reaction force is applied in order to obtain a feeling of pushing the key of a natural or non-electric keyboard musical instrument. Therefore, in both cases, it is not possible to reduce power or force which is necessary for pushing the keys when a keyboard musical instrument is manually played.

SUMMARY OF THE INVENTION

The present invention was conceived in order to solve the above-described problems, and has an objective to provide a key actuating system which helps quickly push the keys by reducing reaction force with respect to pushing the keys during manual operation, and which supports a person having less strength to play the keyboard musical instrument.

In order to solve the above-described problems, the present invention has the following aspects.

A first aspect of the present invention is a key actuating system for a keyboard musical instrument which generates a sound when a key is pushed, including: a pressure detection sensor detecting a pushing pressure on the key; a status detection sensor detecting a movement status of the key: an actuator actuating the key in a pushing direction of the key; and a control portion, when the pressure detection sensor detects the pushing pressure and the status detection sensor detects motion of the key, controlling operations of the actuator in order to maintain the detected pressure by the pressure detection sensor to be a pressure threshold which is in a range larger than 0 and smaller than a pushing pressure on the key which is necessary for making a sound.

In accordance with the key actuating system of the above-described aspect of the present invention, both pushing pressure and movement or operation of the key are detected. Therefore, it is possible to detect the beginning of pushing the key by a person's finger. When the person pushes the key, the control portion controls the operation of the actuator in a manner in which the key is moved in the a pushing direction of the key so as to maintain the detection result of the pressure detection sensor at a pressure threshold which is lower than the pressure required to push the key (pressure in a case of pushing the key only by a person's finger). Therefore, it is possible to generate sound by pushing the key with a smaller force than the normal pressure required to push the key in order to generate a sound. In other words, upon manual operation, the actuator assists a person with pushing the key in order to reduce the reaction force caused by pushing the force on the key.

A second aspect of the present invention may be the above-described key actuating system, wherein after controlling operations of the actuator in order to maintain the detected pressure by the pressure detection sensor to be the pressure threshold, the control portion conducts a feedback operation of the actuator in order to catch up with motion of the key based on detected results of the status detection sensor.

A third aspect of the present invention may be the above-described key actuating system further including: a history table showing a time record of the pushing pressure which is necessary for making a sound and is applied on the key; and a memory portion which stores the history table corresponding to motion speed of the key, wherein the control portion, when the pressure detection sensor detects the pushing pressure and the status detection sensor detects motion of the key, calculates motion speed of the key based on the detection result of the status sensor, read the history table corresponding to the calculated motion speed, and sets the pressure threshold in reference to the read history table.

In accordance with the first aspect of the present invention, it is possible to reduce the reaction force caused by the pushing force of a person's finger on the key. Therefore, by setting the pressure threshold to a fixed value, it is possible to quickly push the keys regardless of high sound portions or low sound portions even if the keyboard musical instrument includes heavy portions which are moved or operated such as a hammer. Moreover, the pressure threshold can be adjusted in accordance with the strength of a player. Therefore, it is possible to play the keyboard musical instrument providing the above described portions which are moved or operated even if the player has less strength.

In accordance with the second aspect of the present invention, the actuator conducts a feedback control operation. Therefore, it is possible to reliably prevent player's operations of the key from being affected by unpleasant influence because of the actuator. That is, it is possible to reliably prevent the key operations from being unusual or unnatural.

In accordance with the third aspect of the present invention, a history table is stored in a memory which shows time records of the pressure upon pushing the keys (records indicate relationship between time and pressure) in correspondence with the motion speed or the pushing speed of the keys. Therefore, it is possible to easily set or optimize the pressure threshold based on the detection results of the state detection sensor.

Moreover, a slow motion speed of a key is linked to a history table for generating a small sound, a fast motion speed of a key is linked to a history table for generating a big sound, and the history tables are stored in the memory. Therefore, just by changing the motion/pushing speed upon pushing the key, it is possible to easily change the volume of sound generated in response to pushing the key.

DETAILED DESCRIPTION OF THE INVENTION

Figure 1:
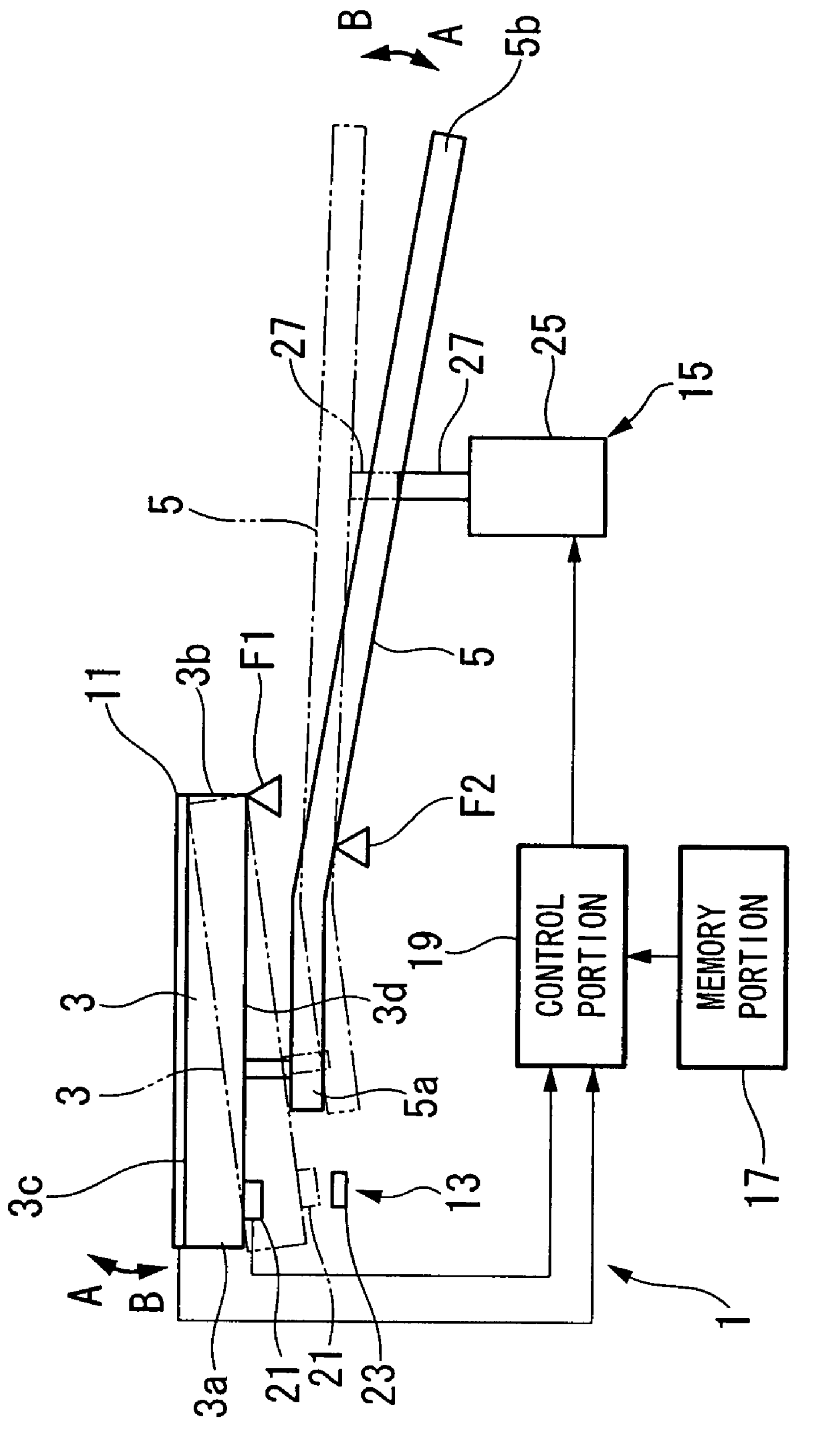
FIG. 1 is an outline constitutional drawing which shows a constitution of the key actuating system of one embodiment of the present invention.

Hereinafter, in reference to FIGS. 1-3, a key actuating system of one embodiment of the present invention is explained. As shown in FIG. 1, a key actuating system 1 has the role of adjusting the reaction force with respect to the pressure of pushing a key upon manual operation of a keyboard musical instrument.

Each of the keys 3 of the keyboard musical instrument has a fulcrum F1 on a back end 3*b* of the key 3 so as to be rotatably movable or pivot with regard to a frame (not shown in figures), and a rotatably movable lever 5 which is attached to the frame so as to be rotatably movable or pivot is arranged at a lower side of the key 3.

The rotatably movable lever 5 is arranged so as to have a length direction which is the same as a length direction of the key 3, and has a fulcrum F2 at a middle of the rotatably movable lever 5 so to be supported by the frame and to be rotatably movable. A front end 5*a* of this rotatably movable lever 5 is engaged with a front end 3*a* of the key 3. Therefore, in accordance with movement of the key 3, the rotatably movable lever 5 is rotatably moved around the fulcrum F2 as the center.

On a side of a rear end 5*b* arranged at the rear side from the fulcrum F2 on the rotatably movable lever 5, a weight is attached such as the hammer of an acoustic piano for hitting a string. The center of gravity of the rotatably movable lever 5 is moved to the rear end 5*b* rather than the fulcrum F2. Therefore, because of the weight of the rotatably movable lever 5, there is a bias on the key 3 toward one direction (direction A) of the rotation movement directions. That is, the rotatably movable lever 5 has a function of a bias means for having a bias on the key 3 toward the direction A.

The keyboard musical instrument has a constitution in which a surface 3*c* of the key 3 is pushed by the finger of a player and the key and the rotatably movable lever 5 are rotatably moved in the opposite direction (direction B) of the direction A in order to generate a sound.

The key actuating system 1 includes: a pressure detection sensor 11 which detects a pressure on the surface 3*c* of the key 3; a status detection sensor 13 which detects a movement status of the key 3; an actuator 15 which actuates or moves the key 3 in a pressing direction of the key (direction B); a memory portion 17 which stores reference data for operating the actuator 15; and a control portion 19 which controls the actuator 15 based on the detection results of both the pressure detection sensor 11 and the status detection sensor 13 and the reference data stored in the memory 17.

The pressure detection sensor 11 is constituted from a pressure perception sensor in a film state which is attached to the surface 3*c* of the key 3. This pressure perception sensor is constituted from, for example, a piezoelectric element which converts the pressure from the finger of a player pushing the surface 3*c* of the key 3 into a voltage. It is possible to directly detect the pressure pushing the key 3 because the pressure detection sensor 11 is constituted from the pressure perception sensor.

The status detection sensor 13 is constituted from a position sensor which detects the position of the key 3 even when the key 3 is rotatably moving. This position sensor is constituted from, for example, both a Hall element 21 attached to a backside surface 3*d* of the front end 3*a* of the key 3 for detecting the magnetic field strength as a voltage, and a magnet 23 attached to the frame so as to face the Hall element 21.

When the key is not being pushed, the Hall element 21 is at an initial position, that is, the Hall element 21 is arranged at a position which is the furthest position from the magnet 23. If the key 3 is rotatably moved in the direction B, the Hall element approaches the magnet 23. The voltage detected by the Hall element 21 is small when the Hall element 21 is further from the magnet 23, and the voltage is larger when the Hall element 21 approaches the magnet 23. Therefore, by detecting the amount of voltage, it is possible for the position sensor to detect the position of the key 3 while rotatably moving.

Regarding position sensor, it should be noted that it is possible to fix the magnet 23 on the backside surface 3*d* of the key 3 while the Hall element 21 is fixed at a side of the frame.

Moreover, it is possible to constitute the position sensor by using an optical sensor or the like because it is necessary and sufficient for the position sensor used as the status detection sensor 13 if it is possible to detect the position of the key 3 while rotatably moving.

The actuator 15 has a constitution which includes: a solenoid coil 25 which is arranged at the bottom side of the rear end 5*b* of the rotatably movable lever 5 and which is fixed to the frame; and a plunger 27 which is inserted into and pierces the solenoid coil 25 so as to touch the rear end 5*b* of the rotatably movable lever 5, and which is a magnetic body. Regarding this actuator 15, the plunger 27 pushes up from the bottom side of the rear end 5*b* of the rotatably movable lever 5 when an electric current is applied to the solenoid coil 25, and it is possible to rotatably move both the rotatably movable lever 5 and the key 3 in the direction B. Here, by changing the amount of electric current applied to the solenoid coil 25, it is possible to control the force pushing up the rear end 5*b* of the rotatably movable lever 5 applied by the plunger 27.

It should be noted that in a state in which no electric current is applied to the solenoid coil 25, the plunger 27 is arranged at the predetermined position and has a function of a resisting portion which resists the rotatably movable lever 5 and the key 3 from rotatably moving in the direction A.

Figure 3:
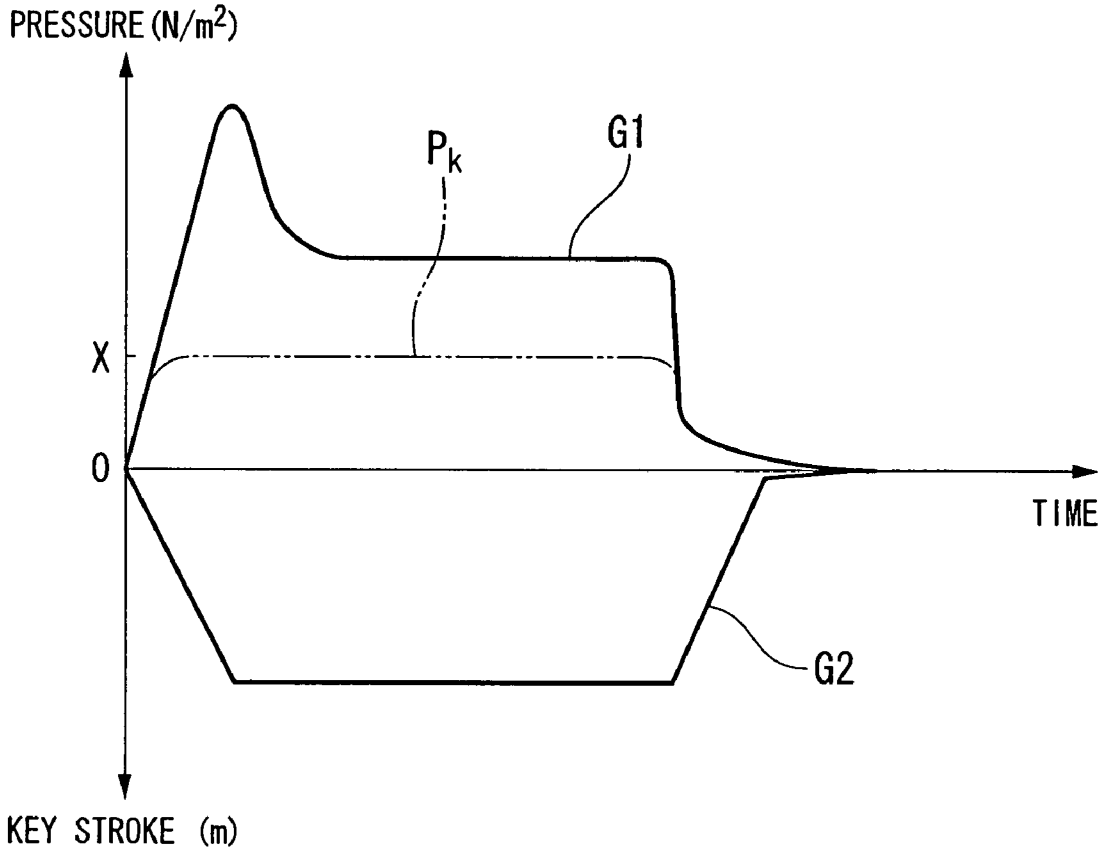
FIG. 3 is a graph which shows the relationship among time records (records indicate relationship between time and pressure) including the key pushing pressure required for generating a sound, a key stroke and pushing pressure against the key which is controlled in accordance with the graph shown in FIG. 2.

Moreover, as shown in FIG. 3, multiple calibration tables G1 which show the time records (records indicate relationship between time and pressure) of pressure on the key necessary for making sounds (pressure on the key pushing only by a finger) are stored in the memory portion 17 as the above-described reference data while the calibration table G1 corresponds to a motion speed of the key 3 in an initial step (hereinafter, initial speed of the key 3). For example, a slow initial speed of the key 3 corresponds to the calibration table G1 for generating a small sound, and a fast initial speed of the key 3 corresponds to the calibration table G1 for generating a big sound.

Next, a method of actuating control of the key 3 conducted by using the key actuation system 1 constituted as described above is explained below. It should be noted that the actuation control of the key 3 explained below is applied to a case in which the player pushes the keys with his/her fingers, that is, the player manually operates the keyboard.

Figure 2:
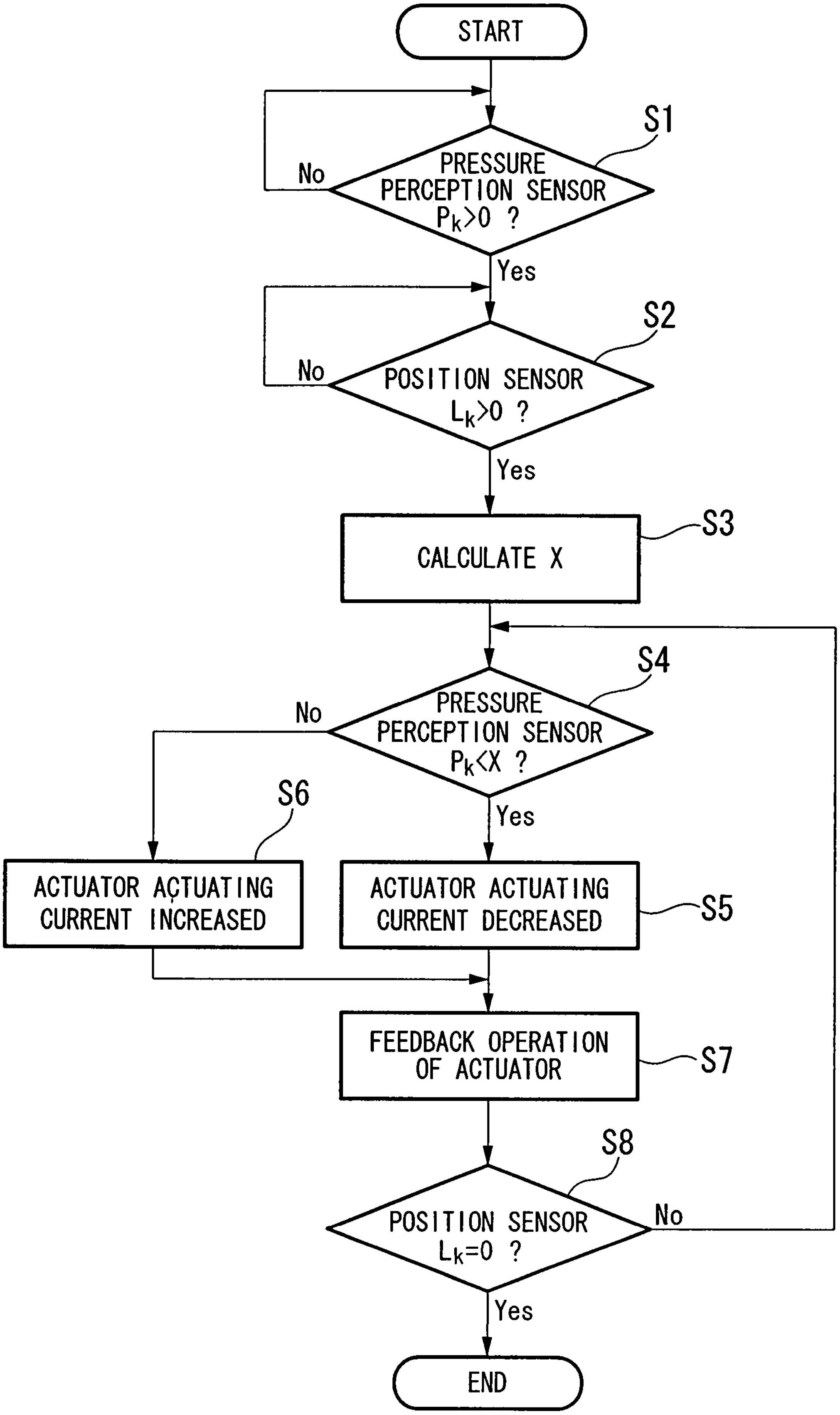
FIG. 2 is a flowchart which shows the actuation control of the key actuating system of one embodiment of the present invention.

As shown in FIG. 2, first, the key 3 is in a state in which the key 3 is set at the initial position, and it is determined (by the control portion 19) whether or not the pressure perception sensor detects a pushing pressure of $P_k$ ($N/m^2$) (Step S1). That is, in Step S1, it is detected whether or not the finger of the player is touching and pushing the surface 3*c* of the key 3. This Step S1 is repeatedly conducted until when the pushing pressure $P_k$ is larger than 0.

After that, if the pressure perception sensor detects the pushing pressure $P_k$ larger than 0 in Step S1, the position sensor determines whether or not a movement of the key 3 is detected (Step S2). That is, in Step S2, it is detected whether or not the key 3 is moved in the direction B from the initial position due to the action of the player's finger. Step S2 is repeatedly conducted until a rotatably moved distance $L_k$ (m) of the key 3 from the initial position in the direction B is larger than 0.

As described above, in Steps S1 and S2, both the pushing pressure $P_k$ and a movement of the key 3 from the initial position are checked. Therefore, it is possible for the control portion 19 to determine whether or not pushing of the key by the player has been initiated.

After that, if it is determined that the position sensor detects the rotatably moved distance $L_k$ larger than 0 in Step S2, the control portion 19 sets a predetermined pressure threshold X ($N/m^2$) based on detected results at Step S2 of the position sensor (Step S3). The pressure threshold X is set larger than 0 and is set smaller than the pushing pressure on the key required for making sounds by pushing only with the finger (see FIG. 3). That is, the pressure threshold X is set a value for pushing the key by applying a smaller force than the pushing pressure.

As a concrete example, in Step S3, the control portion 19 calculates an initial speed of the key 3 based on the rotatably moved distance $L_k$ which is detected at Step S2, reads the calibration table G1 corresponding to the initial speed (see FIG. 3) from the memory portion 17, and set the pressure threshold X in reference to the calibration table G1.

After Step S3, the control portion 19 controls operations of the actuator 15 in a manner in which the detection result of the pressure perception sensor is maintained at the pressure threshold X, and in which the key 3 moves corresponding to the calibration table G1 showing the pushing pressure.

In concrete operation steps, first, the control portion 19 compares the pushing pressure $P_k$ detected by the pressure perception sensor and the pressure threshold X (Step S4). If it is determined that the pushing pressure $P_k$ is smaller than the pressure threshold X, an actuating current supplied to the solenoid coil 25 is reduced according to a request from the control portion 19 because it is not possible for the finger of the player to catch up with a movement of the key 3 (Step S5). In this case, an actuating force applied to the key 3 by the actuator 15 is reduced. Therefore, the pushing pressure $P_k$ is increased and it is possible for the finger of the player to catch up with movement of the key 3 upon pushing the key.

It should be noted that in this Step 5, even if the actuating current is 0 and the pushing pressure $P_k$ is smaller than the pressure threshold X, the actuating current is set to 0. In other words, there is only one direction of the actuation current which is supplied to the solenoid coil 25, and the actuator 15 is constituted so as not to actuate the key 3 in the direction A.

On the other hand, in this Step S4, if the pushing pressure $P_k$ is larger than the pressure threshold X, the actuating current supplied to the solenoid coil 25 of the actuator 15 is increased in accordance with a request from the control portion 19 (Step S6). Therefore, the actuating force applied to the key 3 is increased by the actuator 15, and it is possible to reduce the reaction force against the finger which is pushing the key so as to be the pressure threshold X.

After Step S5 or S6, the control portion 19 calculates motion speed, acceleration, and the like of the key 3 based on the detection result of the position sensor. The control portion 19 conducts a feedback control on operations of the actuator 15 so as to catch up with the motion speed and the acceleration of the key 3 (Step S7). The current applied on the solenoid coil 25 is increased or decreased in this feedback control too. Therefore, by conducting this Step S7, it is possible to reliably prevent operations of the key 3 from being affected by unpleasant influence because of the actuator 15. That is, it is possible to reliably prevent the movement of the key 3 from being unnatural.

After Step S7 described above, the position sensor detects position of the key 3 as it moves rotatably and detects whether or not the key 3 has returned to the initial position ($L_k$=0) (Step S8). Here, if it is determined that the key 3 has not returned to the initial position, the operation returns to Step S4 again and the pushing pressure $P_k$ is compared to the pressure threshold X.

Moreover, if it is determined that the key 3 has returned to the initial position in Step S8, the operation of pushing the key by the player has finished.

In accordance with the actuation operation on the key 3 as described above, the chain double-dashed line of FIG. 3 shows the time records (records indicate relationship between time and pressure) of the pushing pressure $P_k$ detected by the pressure perception sensor. That is, the pushing pressure $P_k$ is the same as the calibration table G1 if the pushing pressure $P_k$ equals the pressure threshold X or less, and in this case, no electric current is applied to the actuator 15. On the other hand, if the pushing pressure $P_k$ reaches the pressure threshold X, the electric current is applied to the actuator 15 in order to actuate the key 3 so as to assist the operation of pushing the key.

In accordance with the above-described key actuation system 1, the control portion 19 controls the operation of the actuator 15 in order to move the key 3 in the direction B in a manner in which the detection result of the pressure detection sensor, that is, the pushing pressure $P_k$ is maintained so as to be at a pressure threshold X which is set so as to be lower than the pressure of pushing the key. Therefore, it is possible to generate sound by pushing the key with a smaller force than normal pressure of pushing the key necessary for generating the sound. In other words, during manual operation, the actuator 15 assists the finger pushing the key in order to reduce the reaction force with respect to pushing force on the key.

Therefore, it is possible to quickly push the keys regardless of high sound portions or low sound portions even if the keyboard musical instrument includes heavy portions which are moved or operated such as a hammer. Moreover, the pressure threshold X can be adjusted in accordance with strength of a player. Therefore, it is possible to play the keyboard musical instrument providing the above described portions which are moved or operated even if the player has less strength.

The calibration table G1 is stored in the memory portion 17 in correspondence with the motion speed or the pushing speed of the keys. Therefore, it is possible to easily set or optimize the pressure threshold X based on the detection results of the position detection sensor.

Moreover, a slow motion speed of a key is linked to the calibration table G1 which generates a small sound, a fast motion speed of a key is linked to the calibration table G1 which generates a big sound, and the calibration tables are stored in the memory portion 17. Therefore, just by changing the initial motion/pushing speed upon pushing the key, it is possible to easily change the volume of sound generated in response to pushing of the key 3.

In the above-described embodiment, the pressure threshold X is set based on the initial motion speed of the key 3. However, this is not a limitation and, for example, it is possible to set a predetermined value to the pressure threshold X before starting the actuation control of the key 3.

Moreover, in the above description, at Step S7, the feedback control of operation of the actuator 15 is based on the detection results of the position sensor. However, this is not a limitation and, for example, as shown in FIG. 3, it is possible for the memory portion 17 to store a time record G2 of strokes of the key 3 beforehand which corresponds to the calibration table G1 of pushing pressure on the key. In this case, at Step S7, it is possible to conduct the feedback operation of the actuator 15 so as to synchronize the position of the key 3 with the time record G2 of the strokes.

Moreover, in the above description, the status detection sensor 13 is constituted from the position sensor for detecting the position of the key 3 as it moves rotatably. However, this is not a limitation, and it is necessary to detect the movement status of the key 3. For example, it is possible to constitute the status detection sensor 13 from a speed sensor which detects a motion speed of the key 3, an acceleration sensor which detects an acceleration of the key 3, or the like. Moreover, it is possible to constitute the status sensor 13 from a combination of the position sensor, the speed sensor and the acceleration sensor.

Figure 4:
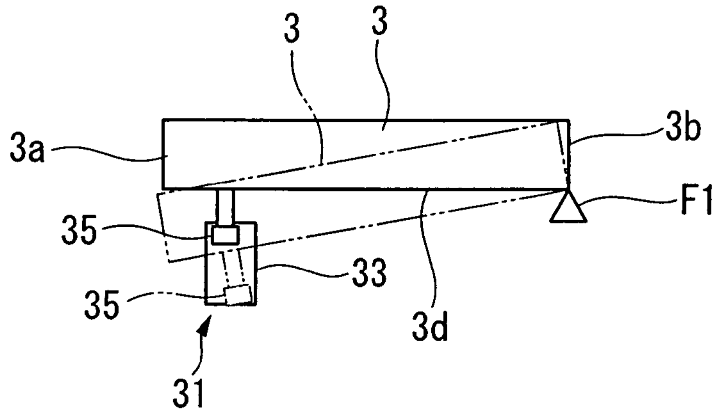
FIG. 4 is an outline side face drawing which shows a status detection sensor of the key actuating system of another embodiment of the present invention.

It should be noted that if the status detection sensor 13 is constituted from the acceleration sensor, for example, as shown in FIG. 4, it is possible to constitute an acceleration sensor 31 from both a coil 33 which is fixed at a position lower than the front end 3*a* of the key 3 and a magnet 35 which is fixed at the backside surface 3*d* of the front end 3*a* of the key 3 and which moves inside the coil 33 in accordance with rotatable movement of the key 3. In this constitution, induced electromotive force is generated at the coil 33 in accordance with the rotatably moving speed of the key 3. Therefore, it is possible to directly detect the speed of the key 3 as it moves rotatably.

Figure 5:
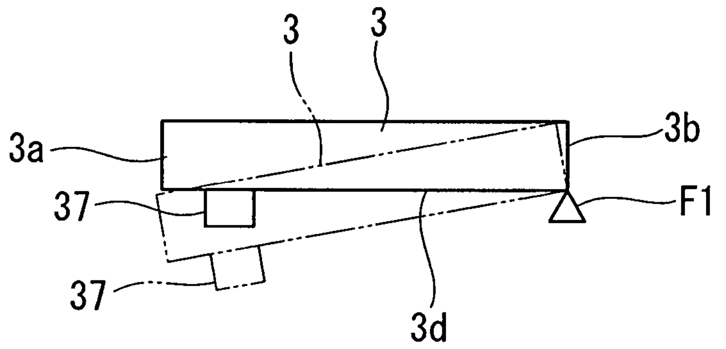
FIG. 5 is an outline side face drawing which shows a status detection sensor of the key actuating system of another embodiment of the present invention.

On the other hand, if the status sensor 13 is constituted from the acceleration sensor, for example, as shown in FIG. 5, it is possible to fix the acceleration sensor 37 which is a type of an MEMS (Micro Electro Mechanical System) on the backside surface 3*d* at the front end 3*a* of the key 3.

Moreover, in the above description, the pressure detection sensor 11 is constituted from the pressure perception sensor attached on the surface 3*c* of the key 3. However, this is not a limitation and it is possible to apply another constitution in which the pushing pressure $P_k$ affecting the key 3 can be detected.

Figure 6:
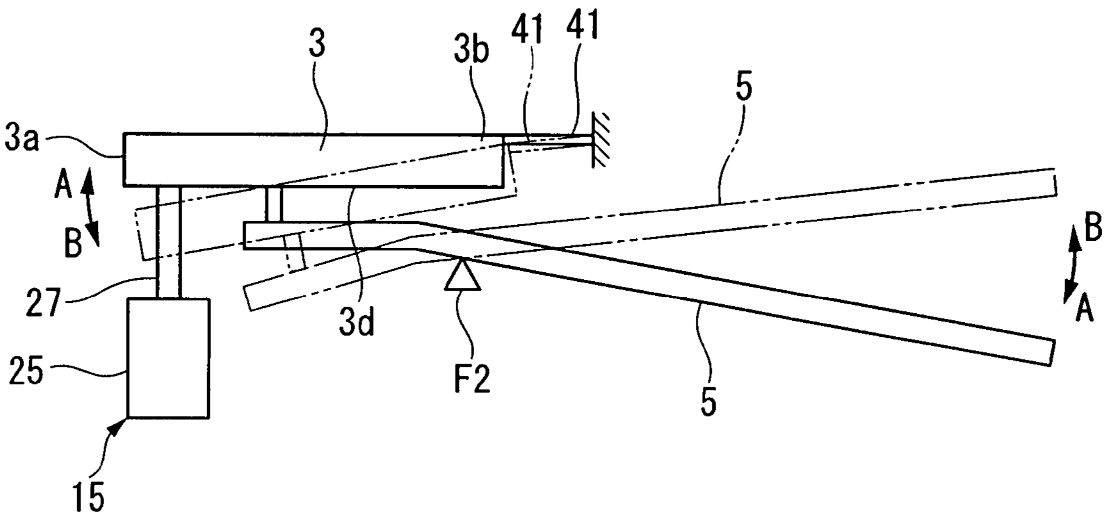
FIG. 6 is an outline side face drawing which shows the arrangement of a pressure detection sensor and an actuator of the key actuating system of another embodiment of the present invention.

In other words, for example, as shown in FIG. 6, it is possible to constitute the pressure detection sensor 11 from a strain gauge 41 which connects both the rear end 3*b* of the key 3 and the frame. The strain gauge 41 is constituted from, for example, a piezoelectric element which generates an electric current when the key 3 is rotatably moved in the direction B, and detects a strain as a voltage. In order to use the strain gauge 41 as the pressure detection sensor, the control portion 19 calculates the pushing pressure $P_k$ applied on the key 3 based on the detected strain.

Furthermore, in the above description, the actuator 15 is arranged so as to push up the rear end 5*b* of the rotatably movable lever 5. However, this is not a limitation, and it is possible to arrange the actuator 15 so as to push up both the key 3 and the rotatably movable lever 5 in the direction B. Therefore, for example, as shown in FIG. 6, it is possible to arrange the actuator 15 at a position lower than a side of the front end 3*a* of the key 3. It should be noted that in this constitution, it is necessary to pull the key 3 in the direction B by using a plunger 27 in order to rotatably move the key 3. Therefore, it is necessary to connect the plunger 27 to the backside surface 3*d* of the key 3 beforehand.

Moreover, in the above description, the actuator 15 is constituted from the solenoid coil 25 and the plunger 27. However, this is not a limitation, and it is possible to apply another constitution in which both the key 3 and the rotatably movable lever 5 are moved in the direction B based on a command from the control portion 19. Therefore, it is possible to constitute the actuator 15 from, for example, an ultrasonic motor, an electromagnetic motor, a shape-memory alloy, a polymeric actuator or a surface acoustic wave motor.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A key actuating system for a keyboard musical instrument which generates a sound when a key is pushed, comprising:

a pressure detection sensor detecting a pushing pressure on the key;

a status detection sensor detecting a movement status of the key:

an actuator actuating the key in a pushing direction of the key; and a control portion, when the pressure detection sensor detects the pushing pressure and the status detection sensor detects movement of the key, controlling operations of the actuator in order to maintain the detected pressure by the pressure detection sensor to be a pressure threshold which is in a range larger than 0 and smaller than a pushing pressure on the key which is necessary for generating a sound.

2. A key actuating system according to claim 1, wherein after controlling operations of the actuator in order to maintain the detected pressure by the pressure detection sensor at the pressure threshold, the control portion conducts a feedback operation of the actuator in order to catch up with movement of the key based on detected results of the status detection sensor.

3. A key actuating system according to claim 1 further comprising:

a calibration table showing a time record of the pushing pressure which is necessary for generating a sound and is applied to the key; and a memory portion which stores the calibration table corresponding to motion speed of the key, wherein the control portion, when the pressure detection sensor detects the pushing pressure and the status detection sensor detects movement of the key, calculates the motion speed of the key based on the detection result of the status sensor, read the calibration table corresponding to the calculated motion speed, and sets the pressure threshold in reference to the read calibration table.

* * * * *